No. 878,533.

R. K. JOHNSTONE.
WELT STRIPPER.
APPLICATION FILED FEB. 26, 1907.

PATENTED FEB. 11, 1908.

3 SHEETS—SHEET 3.

Witnesses:

Inventor:
Robert K. Johnstone
by his attorney

UNITED STATES PATENT OFFICE.

ROBERT K. JOHNSTONE, OF SALEM, MASSACHUSETTS, ASSIGNOR TO A. C. LAWRENCE LEATHER COMPANY, A CORPORATION OF MAINE.

WELT-STRIPPER.

No. 878,533.  Specification of Letters Patent.  Patented Feb. 11, 1908.

Application filed February 26, 1907. Serial No. 359,466.

*To all whom it may concern:*

Be it known that I, ROBERT K. JOHNSTONE, a citizen of the United States, residing at Salem, in the county of Essex and State of Massachusetts, have invented new and useful Improvements in Welt-Strippers, of which the following is a specification.

This invention relates to improvements in machines for slitting strips of leather into narrow strips to be used for welts and will be best understood by the following description when taken in connection with the accompanying illustration showing one specific embodiment thereof, while its scope will be more particularly pointed out in the appended claims.

Figure 1:
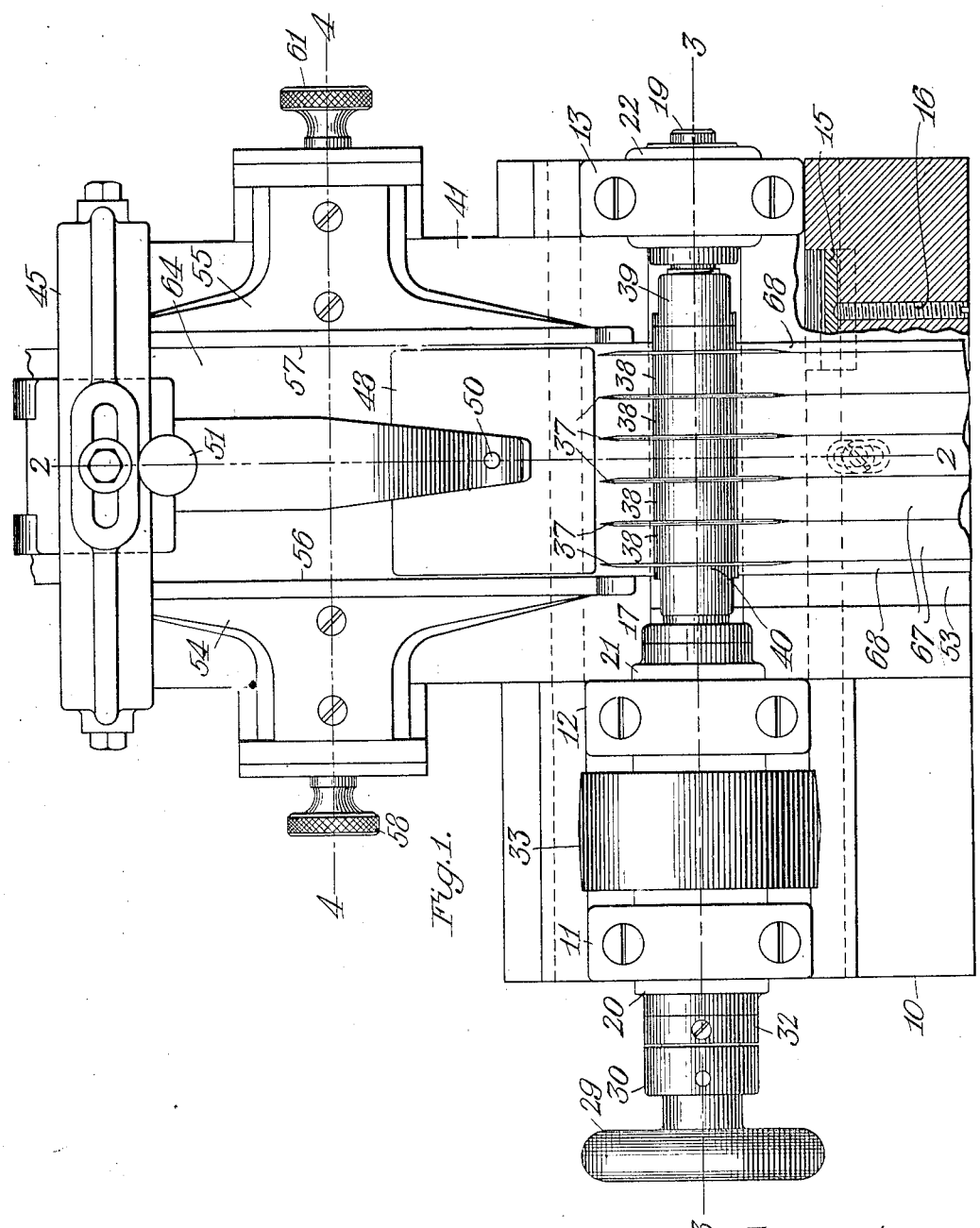
Figure 2:
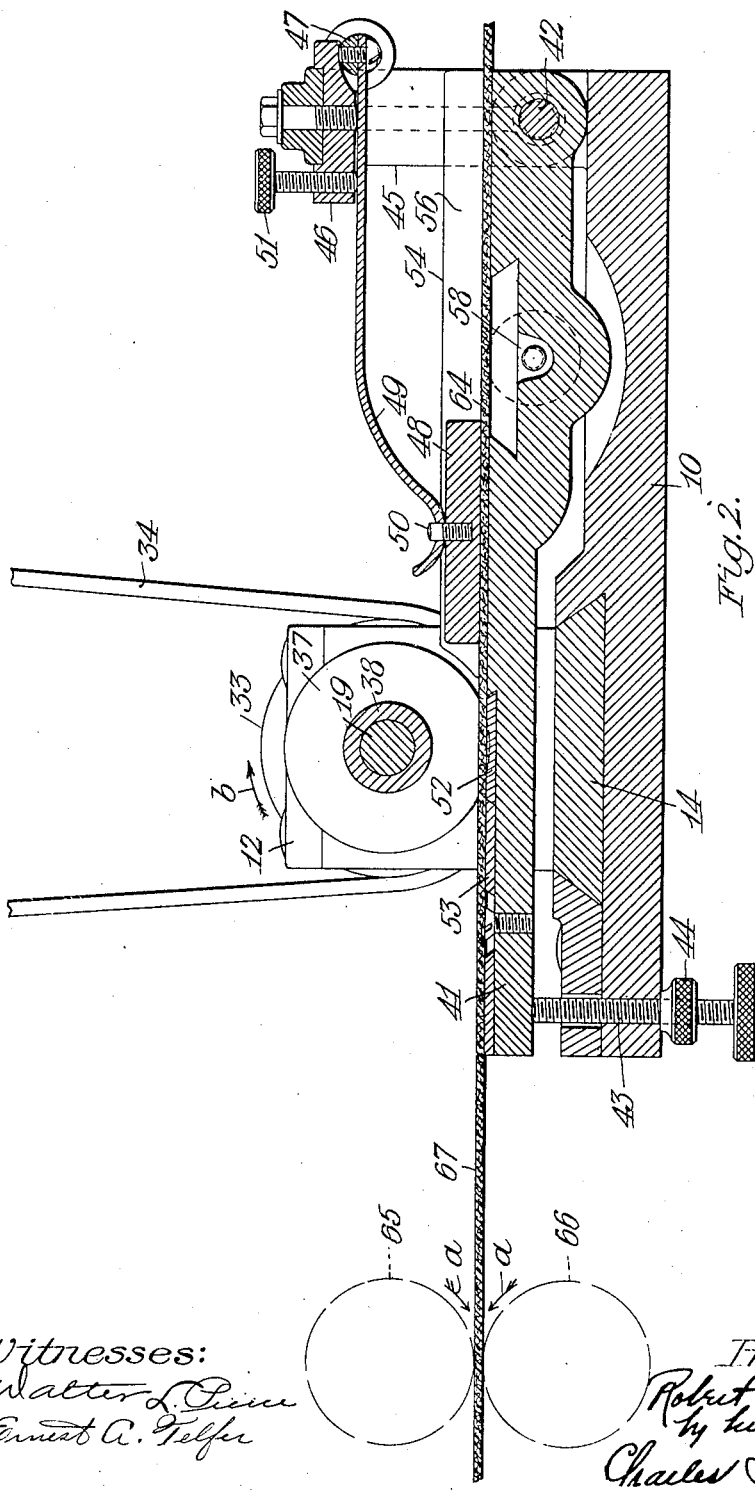
Figure 3:
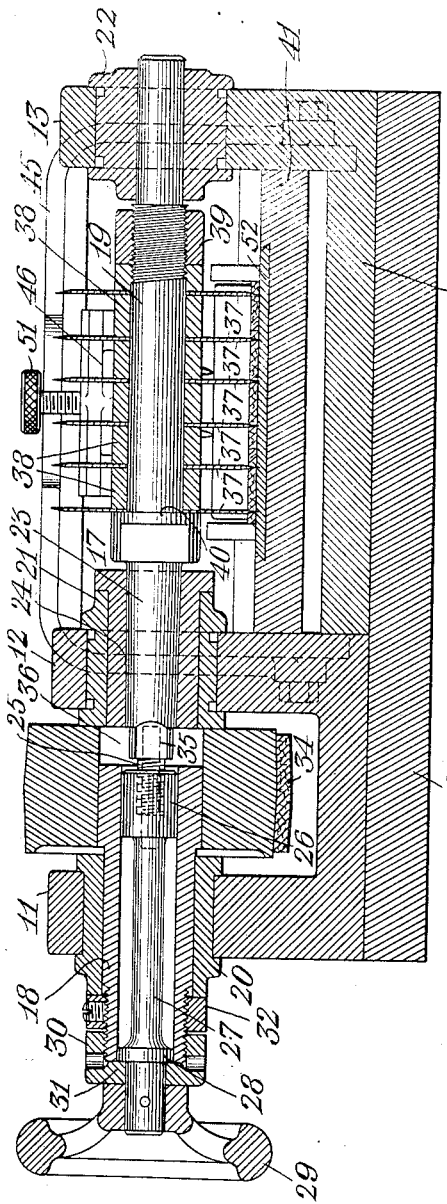
Figure 4:
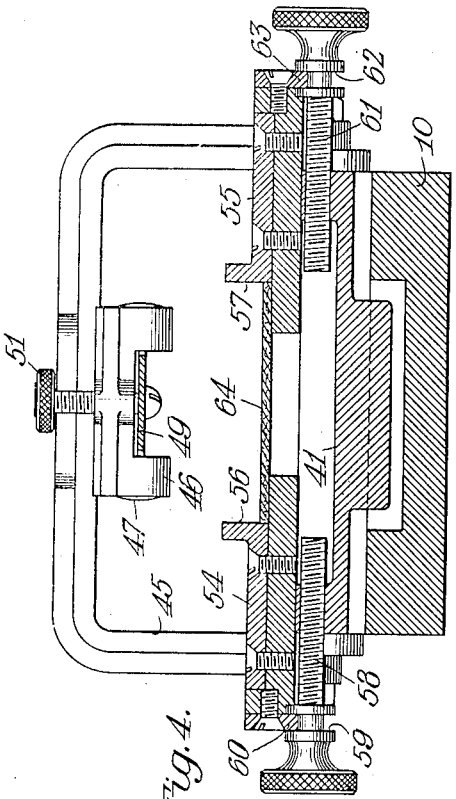

Referring to the drawings: Figure 1 is a plan view of my improved welt stripper, partly broken away and partly in section. Fig. 2 is a section taken on line 2—2 of Fig 1 looking toward the left. Fig. 3 is a section taken on line 3—3 of Fig. 1. Fig. 4 is a section taken on line 4—4 of Fig. 1.

Like numerals refer to like parts throughout the several views of the drawings.

In the drawings, 10 is a base having bearings 11, 12, and 13 mounted thereon. The bearing 13 is provided with an extension 14 which is dovetailed into the base 10 and is adapted to be readily removed therefrom, there being a gib 15 adapted to be forced against said extension by means of a gib-screw 16, whereby said bearing may be held in place by friction. A spindle 17 comprising a hollow shaft 18 and an arbor or mandrel 19 is journaled in the bearings 11, 12, and 13. The bearings 11, 12, and 13 are provided, respectively, with boxes 20, 21, and 22. The arbor 19 is provided with a taper shank 23 which is located in a corresponding tapered hole 24 formed in the shaft 18. A screw-threaded stem 25 extends from the taper shank 23 and has screw-threaded engagement with a nut 26, said nut being rotatably mounted within the shaft 18. The nut 26 is provided with a stem 27 having a flange 28, while a hand wheel 29 is fast to said stem.

A collar 30 having screw-threaded engagement with the shaft 18 is provided with an annular flange 31 which bears against the flange 28. A collar 32 having screw-threaded engagement with the shaft 18 is adapted to prevent endwise movement of said shaft. A pulley 33 fast to the shaft 18 is adapted to be rotated by a belt 34 driven by a suitable counter-shaft, not shown. The shank 23 is flatted at 35 and the shaft 18 is provided with a recess 36 which said flatted portion fits, whereby rotation of the arbor 19 relative to said shaft is prevented. A plurality of circular cutters 37 are mounted on the arbor 19, said cutters being separated by collars 38. A nut 39 having screw-threaded engagement with the arbor 19 is adapted to force the cutters 37 and the collars 38 toward a shoulder 40 formed on said arbor, thereby preventing rotation of said cutters on said arbor.

A work table 41 is pivoted at 42 to the base 10, the axis of said pivot being parallel to the axis of the arbor 19. An adjusting screw 43 having screw-threaded engagement with the base 10 is adapted to adjust the work table 41 toward the cutters 37, while a check nut 44 is adapted to lock said adjusting screw against rotation when it has been properly adjusted. A U-shaped bracket or yoke 45 straddles the work table 41 and is fast to the base 10. A bracket 46 which is adjustable on the bracket 45 supports a pivotal pin 47. A presser block 48, the purpose of which will be described hereinafter, is adapted to be forced toward the work table 41 by a spring 49 fast to the pin 47, while a pin 50 fast to said presser block and entering a hole in said spring is adapted to prevent movement of said presser block longitudinally of the work table 41. The tension of the spring 49 may be adjusted by means of an adjusting screw 51 having screw-threaded engagement with the bracket 46.

A platen 52 preferably formed of fibrous material, such as wood, is mounted on the work table 41 being dovetailed therein and secured in place by means of a gib 53. The grain of the wood of said platen extends transversely of the arbor 19. When in operation the cutters 37 are preferably very slightly embedded in the platen 52. Two slides 54 and 55 are dovetailed in the work table 41 and are movable toward and away from each other, said guides being provided with guiding faces 56 and 57, respectively, which are at right angles to the axis of the arbor 19. An adjusting screw 58 having screw-threaded engagement with the work table 41 is provided with an annular groove 59 in which is located a lug 60 on the slide 54, whereby when said screw is rotated said slide may be moved transversely of the work table 41. An adjusting screw 61 identical with the screw 58 is provided with an annular groove 62 in which is located a lug 63 on the slide 55.

The general operation of the mechanism hereinbefore specifically described is as follows: A strip of leather 64 which is usually a number of feet in length is placed on the work table 41, is passed beneath the presser block 48 under the cutters 37 and is introduced between two suitable feed rolls 65 and 66 which are indicated diagrammatically in Fig. 2 by dotted lines, said feed rolls being adapted to be driven in the direction of the arrows a by any suitable mechanism, not shown. The pulley 33 is adapted to be rotated in the direction of the arrow b, Fig. 2, by means of the belt 34, said pulley being preferably rotated at a slightly less speed than the feed rolls 65 and 66. As hereinbefore stated the cutters 37 are preferably slightly embedded in the platen 52. As the strip of leather 64 is fed from right to left, Fig. 2, the presser block 48 presses said strip against the work table 41 and maintains a uniform tension on the entire surface of said strip as it passes beneath said presser block. As the strip 64 passes beneath the cutters 37 it is slit into narrow strips 67, there being two narrow strips of waste 68, 68 cut from the edges of the strip 64. The edges of the strips 64 are usually curvilinear or wavy and said strip is apt to vary in width as well as being sometimes a little bit crooked. To compensate for inequalities in width of the strip 64, the operator of the machine from time to time by means of the screws 58 and 61 adjusts the guides 54 and 55 toward and away from each other. It will also be understood that by adjusting the guides 54 and 55, the strip 64 may be moved bodily transversely of the work table 41, in order that there may be an equal amount of waste taken off of either side of said strip.

It will be noted that the two end cutters 37, that is, those which are most remote from each other, are beveled inwardly while the remaining intermediate cutters are beveled in both directions, it having been found that this arrangement produces the most satisfactory results. When it is desired to cut strips greater or less in width than the strip 64, the arbor 19 having the cutters 37 thereon may be removed bodily from the machine and another arbor having properly spaced cutters is substituted for the one taken out. In practice I prefer to have a supply of arbors having cutters mounted thereon, the cutters on each of the arbors being spaced differently from the others, that is, the supply of arbors will be sufficient to cover the entire range of widths of welts desired.

The removal and replacement of the arbor 19 is as follows: The operator slightly loosens the gib 15 by rotating the screw 16 in the proper direction and then by rotating the screw 43 lowers the work table 41 until the platen 52 is entirely out of contact with the cutters 37. He then withdraws the bearing 13 in the direction of the length of the arbor 19. He next rotates the hand wheel 29 in the proper direction to cause the nut 26 by reason of its screw-threaded engagement with the stem 25 to force the arbor 19 toward the right, Figs. 1 and 3, thus moving the flatted portion 35 out of the recess 36 so that said arbor when the stem 25 has been freed from the nut 26 may be removed by the operator and replaced by another.

It will be understood that in the operation of introducing a second arbor the reverse of the foregoing takes place, it being understood that the nut 26 by reason of its engagement with the stem 25 is adapted to draw the taper shank 23 into place, whereby said arbor becomes securely fastened to the shaft 18.

Having thus described my invention, what I claim and desire by Letters Patent to secure is:

1. In a welt stripper, a base, a bearing mounted on said base, a spindle journaled in said bearing, a cutter fast to said spindle, a work table pivoted to said base with its axis parallel to the axis of said spindle, means for adjusting said work table relative to said spindle, two guides having guiding faces at right angles to the axis of said spindle, and instrumentalities for adjusting said guides relative to each other, said instrumentalities being independent of each other.

2. In a welt stripper, a base, a bearing mounted on said base, a spindle journaled in said bearing, a cutter fast to said spindle, a work table movable transversely of said spindle, means for adjusting said table relative to said spindle, two guides having guiding faces at right angles to the axis of said spindle, said guides slidably mounted on said table, and two adjusting screws adapted to move said guides, respectively, independently of each other and toward and away from each other.

3. In a welt stripper, a base, a fixed bearing mounted on said base, a shaft journaled in said bearing, a second bearing detachably attached to said base, an arbor one end of which is detachably attached to said shaft, the other end of said arbor being journaled in said detachable bearing, a plurality of circular cutters mounted on said arbor, a work table pivotally mounted on said base with its axis parallel to the axis of said arbor, and means for adjusting said work table toward said arbor.

4. In a welt stripper, a base, a fixed bearing mounted on said base, a shaft journaled in said bearing, a second bearing detachably attached to said base, an arbor one end of which is detachably attached to said shaft, the other end of said arbor being journaled in said detachable bearing, a plurality of circular cutters mounted on said arbor, a work table pivotally mounted on said base with its axis parallel to the axis of said arbor, means for adjusting said work table toward said arbor, and two guides having guiding faces at right angles to the axis of said arbor.

5. In a welt stripper, a base, a fixed bearing mounted on said base, a hollow shaft journaled in said bearing, a second bearing detachably attached to said base, an arbor provided with a taper shank located in a tapered hole provided in said shaft, said arbor also provided with a screw-threaded stem extending from said shank, a nut rotatably mounted within said shaft, said nut having engagement with said stem, means for holding said nut against movement longitudinally of said shaft, a cutter mounted on said arbor, and a work table movable transversely of said arbor.

6. In a welt stripper, a base, a fixed bearing mounted on said base, a hollow shaft journaled in said bearing, a second bearing detachably attached to said base, an arbor provided with a taper shank located in a tapered hole provided in said shaft, said arbor also provided with a screw-threaded stem extending from said shank, said shank being provided with two flat faces adapted to engage corresponding flat faces of a recess provided within said shaft, a nut rotatably mounted within said shaft, said nut having engagement with said stem, means for holding said nut against movement longitudinally of said shaft, a cutter mounted on said arbor, and a work table movable transversely of said arbor.

7. In a welt stripper, a base, a fixed bearing mounted on said base, a hollow shaft journaled in said bearing, a second bearing detachably attached to said base, an arbor provided with a taper shank located in a tapered hole provided in said shaft, said arbor also provided with a screw-threaded stem extending from said shank, a nut rotatably mounted within said shaft, said nut having engagement with said stem, means for holding said nut against movement longitudinally of said shaft, a cutter mounted on said arbor, means for adjusting said work table relative to said arbor, and two adjustable guides having guiding faces at right angles to the axis of said arbor.

8. In a welt stripper, a base, a fixed bearing mounted on said base, a hollow shaft journaled in said bearing, a second bearing detachably attached to said base, an arbor provided with a taper shank located in a tapered hole provided in said shaft, said arbor also provided with a screw-threaded stem extending from said shank, a nut rotatably mounted within said shaft, said nut having engagement with said stem, means for holding said nut against movement longitudinally of said shaft, a cutter mounted on said arbor, a work table pivoted to said base, with its axis parallel to the axis of said arbor, and means for adjusting said table relative to said arbor.

9. In a welt stripper, a base, a fixed bearing mounted on said base, a hollow shaft journaled in said bearing, a second bearing detachably attached to said base, an arbor provided with a taper shank located in a tapered hole provided with said shaft, said arbor also provided with a screw-threaded stem extending from said shank, a nut rotatably mounted within said shaft, said nut having engagement with said stem, means for holding said nut against movement longitudinally of said shaft, a cutter mounted on said arbor, a work table pivoted to said base with its axis parallel to the axis of said arbor, means for adjusting said table relative to said arbor, two guides having guiding faces at right angles to the axis of said arbor, and means for adjusting said guides.

In testimony whereof I have hereunto set my hand in presence of two subscribing witnesses.

ROBERT K. JOHNSTONE

Witnesses:
    CHARLES S. GOODING,
    LOUIS A. JONES.